United States Patent [19]
Lewis

[11] Patent Number: 5,772,263
[45] Date of Patent: Jun. 30, 1998

[54] ONE PIECE QUICK CONNECTOR AND INTEGRAL RETAINER

[75] Inventor: J. Gordon Lewis, Bloomfield Hills, Mich.

[73] Assignee: ITT Automotive, Inc., Auburn Hills, Mich.

[21] Appl. No.: 770,663

[22] Filed: Dec. 20, 1996

[51] Int. Cl.$^6$ .................................................. F16L 39/00
[52] U.S. Cl. .......................... 285/319; 285/423; 285/906; 285/921
[58] Field of Search .................................. 285/319, 921, 285/423, 906

[56] References Cited

U.S. PATENT DOCUMENTS

| | | | |
|---|---|---|---|
| 3,250,551 | 5/1966 | Draudt | 285/319 X |
| 4,793,637 | 12/1988 | Laipply et al. | |
| 4,793,639 | 12/1988 | Glouer et al. | |
| 5,084,954 | 2/1992 | Klinger | |
| 5,161,833 | 11/1992 | McNaughton et al. | |
| 5,285,776 | 2/1994 | Bertram | 285/319 X |
| 5,462,313 | 10/1995 | Rea et al. | 285/319 X |
| 5,466,017 | 11/1995 | Szabo | |
| 5,468,024 | 11/1995 | Carman et al. | |
| 5,542,717 | 8/1996 | Rea et al. | 285/319 |

FOREIGN PATENT DOCUMENTS

| | | |
|---|---|---|
| 0573863 | 12/1993 | European Pat. Off. |
| 0728977 | 8/1996 | European Pat. Off. |
| 7129110 | 1/1972 | Germany |
| 2217417 | 10/1989 | United Kingdom |
| 2264761 | 9/1993 | United Kingdom ................... 285/319 |
| 8606814 | 11/1986 | WIPO |
| 8901109 | 2/1989 | WIPO |

OTHER PUBLICATIONS

International Search Report Dated Dec. 11, 1997 In The Corresponding PCT Application.

*Primary Examiner*—Dave W. Arola
*Attorney, Agent, or Firm*—Thomas N. Twomey; J. Gordon Lewis

[57] ABSTRACT

A quick connector formed of a housing having a through bore receiving one end of a male connector with a radially enlarged flange. At least one and preferably a plurality of circumferentially spaced retainer fingers are integrally formed as a one piece extension from the first end of the housing and are deployable from a first axially extending position to an angular inwardly extending position in the bore in the housing to engage the flange on the male connector after the male connector has been inserted into the bore in the housing to lockingly couple the male connector in the housing. In a connector having a metal housing, a plurality of circumferentially spaced fingers are formed to axially extend from a first open end. The fingers are bent into an angular, inwardly extending position to engage the flange on the male connector. In another embodiment for use with a metal quick connector housing, a molded annular band has a plurality of circumferentially spaced fingers extending therefrom. The band is mounted within the bore in the housing adjacent an in-turned end of the housing, with the fingers deployable from a first axially extending position to an angular inwardly extending latching position.

18 Claims, 3 Drawing Sheets

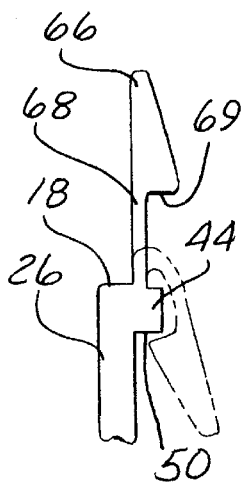
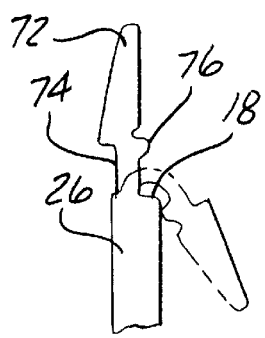
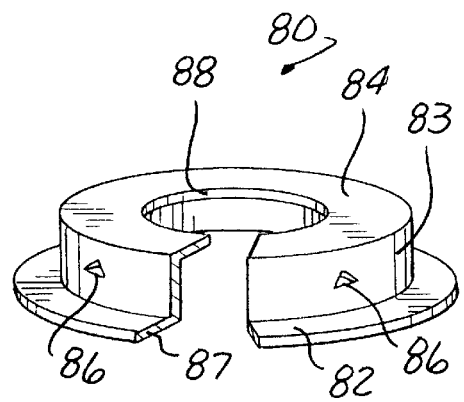
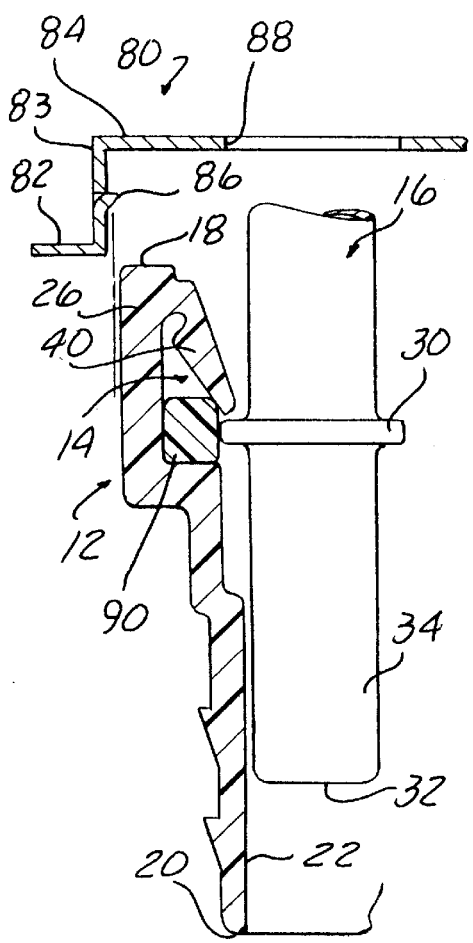
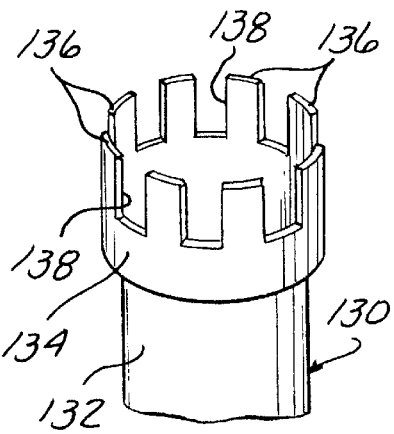
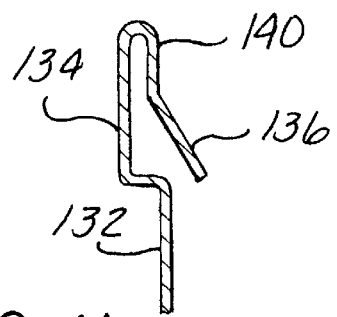

5,772,263

ONE PIECE QUICK CONNECTOR AND INTEGRAL RETAINER

BACKGROUND OF THE INVENTION

1. Field of the Invention

The present invention relates to snap-fit or quick connectors, and more particularly to such connectors which are employed in fluid conduit systems to facilitate connection and disconnection of fluid conduits.

2. Description of the Art

Snap-fit or quick connectors have been found to be useful in a wide range of applications. In particular, they are frequently employed for joining fluid carrying conduits in automotive and industrial applications. Such connectors have found general acceptance as they are typically capable of being closed in a single uniaxial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system.

Typically, quick connectors employ a female component or housing which fixedly receives one end of one conduit or tube. A retainer is mounted in the female component and typically includes a pair of deflectable fingers which snap behind a raised annular flange on a male conduit or tube after the male conduit or tube has been fully inserted into the female component. A variety of types of retainers are employed including one which snaps into apertures formed in the female component so as to be actuatable by itself to permit separation of the male and female components. Another type of retainer is housed completely within a female component thereby requiring the use of a special tool to effect release of the quick connector components.

One piece, squeeze-to-release quick connectors are also known. In this type of connector, a flexible ring is attached by two thin beam members to the open end of the female component. Two deflectable fingers extend from opposed sides of the ring and are disengaged from the annular flange on the male component when opposite portions of the ring are squeezed together.

While such quick connectors normally provide effective seals between two fluid carrying conduits or members, the retainers employed in such quick connectors require specially designed housings as well as a separate retainer component which adds cost and assembly time to the manufacture of the quick connector.

Thus, it would be desirable to provide a quick connector having an integral retainer which can be manufactured at low cost, which forms a complete seal between two fluid conduits, and which exhibits a high pull off or separation force. It would also be desirable to provide a quick connector with an integral retainer which eliminates the need for a separate retainer and a specially designed housing for receiving a separate retainer.

SUMMARY OF THE INVENTION

The present invention is a one piece quick connector and integral retainer which sealingly locks a male connector and a female connector in a sealed relationship.

The quick connector of the present invention includes a housing having a through bore extending from a first end to an opposed second end; and at least one bendable retainer finger integrally formed as a one piece extension of the housing and projecting from the first end of the housing, the at least one retainer finger movable from a first, normal, inoperative position external of the housing to a second position in the through bore in the housing to engage the abutment surface on the male connector upon insertion of the male connector into the through bore in the housing.

Preferably, the at least one retainer finger includes a plurality of circumferentially spaced fingers. Further, the plurality of retainer fingers are arranged in at least one pair of diametrically opposed fingers. Further, and more preferably, a plurality of pairs of diametrically opposed retainer fingers are formed on the housing of the quick connector.

A thin, flexible web connects each finger to the end of the housing. The web is positionable at a number of different locations on the first end of the housing, including one position extending axially from the first end of the housing, at another position extending axially from a radially outward extending projection formed on the first end of the housing, or in another position in which the web extends axially from a radially inward extending projection formed at the first end of the housing.

Higher pull out resistance is obtained by forming each finger with a recess at the end adjacent to the web to provide an edge which is normally spaced from an edge on the radially inward extending projection at the first end of the housing; but is engageable with the edge on the radially inward extending projection whenever axial forces are exerted on the quick connector tending to separate the connector parts.

In an optional embodiment, a metal clip means is mountable over the first end of the housing into engagement with an exterior surface of the housing for adding additional pull out resistance by maintaining the deflectable retainer fingers in their inward, angularly extending, latching position in engagement with the annular flange on the male component disposed within the bore in the housing.

In another embodiment, the housing is made of metal, with the at least one and, preferably, a plurality of retainer fingers normally extending axially from one end of the housing. The fingers are bendable to an angular, inward extending, latching position for engagement with the annular flange the male connector.

In another embodiment, the retainer is a separate annular band having a plurality of spaced fingers integrally molded on and extending from the band. The band is formed into an annulus and mounted within the bore of a metal connector housing between an internal shoulder in the bore and an in-turned end of the housing. The fingers normally extend axially out of the open first end of the housing, but are deployable to an angular inward extending position to lockingly engage the annular flange on the male connector when the male connector is inserted into the bore in the housing.

In most embodiments, the retainer is integrally formed as a one piece extension of the connector housing thereby eliminating the need for a separate retainer or a specially designed housing to accommodate the separate retainer as in a large number of previously devised quick connectors. This lowers manufacturing costs of the quick connector while still providing high pull out resistance and a complete seal between two mating connector parts. The integral retainer may also be formed as a one piece extension of a metal connector housing to provide the same functions.

In an alternate embodiment, the retainer is a separate, molded member, but one including a plurality of normally axially extending, bendable fingers which are deployable from a first position normally extending axially outward from the first end of the housing, to an angularly inward extending position engageable with the annular flange on the male connector.

BRIEF DESCRIPTION OF THE DRAWING

The various features, advantages and other uses of the present invention will become more apparent by referring to the following detailed description and drawing in which:

FIG. 6 is an alternate embodiment of the retainer mounted on the quick connector of the present invention;

FIG. 7 is another embodiment of the retainer;

FIG. 8 is a perspective view of an optional metal clip employed with the quick connector shown in FIG. 1;

FIG. 9 is a partial, longitudinal, cross sectional view showing the mounting of the clip shown in FIG. 8 on the quick connector shown in FIG. 1;

FIG. 10 is a perspective view of an alternate embodiment of a quick connector according to the present invention shown in a preassembled state;

FIG. 11 is a cross-sectional view of the quick connector shown in FIG. 10, formed into an operational position;

DESCRIPTION OF THE PREFERRED EMBODIMENTS

Figure 1:
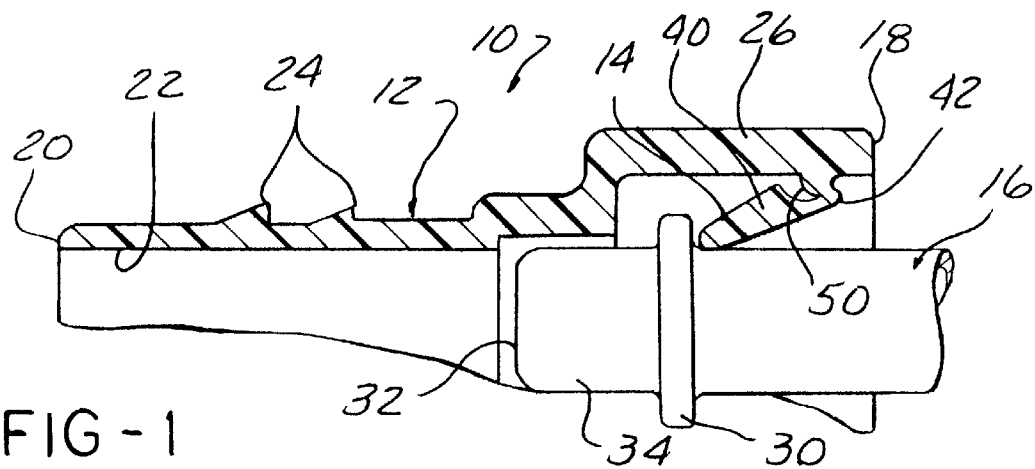
FIG. 1 is a partial, longitudinal, cross sectional view showing a one piece quick connector integral retainer according to the present invention.

Referring now to the drawing, and to FIG. 1, in particular, there is depicted a quick connector 10 of the present invention. The quick connector 10 includes a female connector part 12, a retainer means 14 and a male connector part or fitting 16. The quick connector 10 described in detail herein below is adapted for incorporation in a system of tubular conduits for conducting fluid flow. However, it is contemplated, that in the broadest sense, the present inventive quick connector could be readily adapted for other applications in view of the present specification.

The female connector part 12 is in the form of an elongated, hollow housing having a first end 18 and an opposed second end 20. A stepped bore 22 is formed within the female connector part 12 and extends axially from the open first end 18 to the open second end 20. A plurality of annular barbs 24 are formed on the exterior of the female connector part 12 and spaced from the second end 20 for receiving a flexible conduit, not shown, thereover.

Figure 3:
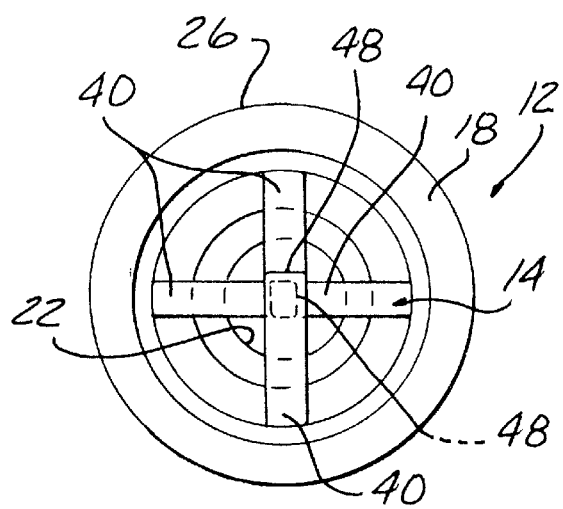
FIG. 3 is a right hand end view of the quick connector shown in FIG. 1.

An end portion 26 of the female connector part 12, extending from the first open end 18, has a generally cylindrical shape as shown in FIG. 3. Although not shown in FIG. 1, suitable seals, such as O-rings, retainers, bushings or top hats, commonly employed in quick connectors, and as shown in U.S. Pat. Nos. 5,084,954; 5,466,017 and 5,468,024, are normally mounted in the stepped bore 22 of the female connector part 12 at a position to sealingly engage an end portion 34 of the male connector part 16. The contents of these listed patents, with respect to the construction of the female connector part thus far described, are incorporated herein by reference.

As is conventional, the male connector part 16, as shown in FIG. 1, is in the form of a conduit or tube having a generally cylindrical, hollow shape. An enlarged, annular, radially outward extending flange, upset bead or abutment surface 30 is formed on the male connector part 16 spaced from one end 32 of the male connector part 16. The end portion 34 on the male connector part 16 extending between the one end 32 and the annular flange 30 is adapted to be slidingly inserted into the stepped bore 22 of the female connector part 12 and held in a fluid sealed coupled relationship with the female connector part 12 by the retainer means 14.

As described above, the retainer means 14 is integrally formed as a one piece, continuous part of the female connector part 12. Since the retainer means 14 is integrally formed with the female connector part 12, both the retainer means 14 and the female connector part 12 are formed of the same material. Preferably, a suitable plastic, such as filled Nylon 12, by example only is employed to form the one piece female connector part 12 and retainer means 14. Other suitable materials may also be employed.

Figure 2:
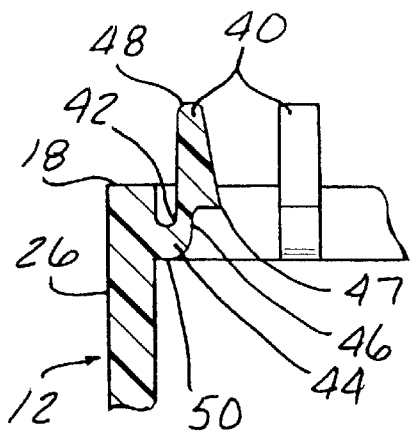
FIG. 2 is an enlarged, partial, preassembled, as molded end view of the quick connector shown in FIG. 1.

As shown in FIGS. 1–3, the retainer means 14 comprises at least one and, preferably, a plurality of fingers 40. The fingers 40 are circumferentially spaced about the open first end 18 of the female connector part 12. Further, the fingers 40 can be provided in any number; although four fingers 40 are shown, by example only, in FIG. 3. Excellent latching capability is provided by an even number of fingers 40 arranged in opposed pairs as shown in FIG. 3. Thus, 2, 4, 6, etc. fingers 40 can provide a sufficient latching capability to the quick connector 10. An odd number of fingers 40 can also be employed, however.

Although the fingers 40 may be provided in different embodiments, as described hereafter, which embodiments vary in the shape of each finger and/or its mounting location on the female connector part 10, all of the fingers, such as fingers 40, share common characteristics such as being integrally connected to the female connector part 12 by a thin web or lining hinge, such as web 42, shown in FIGS. 1 and 2. Further, in all of the different embodiments of the fingers, the fingers, such as fingers 40, are initially formed to extend in a general axial direction with respect to a longitudinal axis extending between the first and second ends 18 and 20 of the female connector part 12, as shown in FIG. 2. Various sized and located recesses or notches formed in each finger 40 adjacent the interconnecting web 42, allow each finger to be folded or bent angularly into the bore 22 extending from the open first end 18 of the female connector part 12 into an operable latching position as shown in FIG. 3.

In the embodiment of the finger 40 shown in FIGS. 1–3, the web 42 extends from a radially inward projection 44 at the first end 18 of the female connector part 12. The web 42 is radially outward offset from the innermost portion of the projection 44 to form a notch 46 which facilitates the folding over or bending of the finger 40 into the interior of the bore 22 in the female connector part 12.

In the embodiment of the finger 40 shown in FIGS. 1–3, the projection 44 is spaced a small distance inward from the open first end 18 of the female connector part 12. The finger 40 extends axially from the web 42 from a first larger end 47 adjacent the web 42 to a tapered outer end 48. When folded into the operable position shown in FIG. 3, the outer ends 48 of the fingers 40 are in close proximity and preferably overlap each other to retain all of the fingers 40 in the folded over position.

As shown in FIGS. 1, 3, 14 and 15, a characteristic length (L) of each finger 40 between the ends 47 and 48 is greater than the nominal radius (r) of the bore 22 at the open first end 18; but not greater than the diameter of the bore. This enables a juxtaposition of overlap of the outer ends 48 of the fingers 40 when the fingers 40 are folded into the bore 22.

The outer ends 48 of the fingers 40 are angled and contoured so as to be substantially parallel to a trailing or axially rear facing surface 31 of the upset or flange 30 on the male connector part 16 when in the folded, locking position for maximum surface contact. Further, each finger 40 is arcuate or crescent shaped in cross-section to register on the outer circumferential surface with the male connector part 16, again for maximum surface contact with the upset 30 on the male connector part 16. When installed in their respective second positions within bore 22, the fingers 40 coact with one another; the lateral sides of each finger 40 registering with the closest lateral sides of its immediate neighbors, to preposition themselves to form a guide passageway for the male connector part 16, each finger 40 self-aligning itself with the outer circumferential surface of the male connector part 16.

The other side or surface of each finger 40 is also arcuately shaped to register with the inner diameter surface of the bore 22 when each finger 40 is urged radially outward during insertion of the upset 30 therepast.

Another unique feature of the embodiment of the finger 40 shown in FIGS. 1–3, and 14 is the inner surface or edge 50 of the projection 44 on the female connector part 12. This surface 50, which is preferably curved or arcuately shaped, will normally be spaced from the inner end 47 of the finger 40 adjacent to the notch 46 when the finger 40 is in its normal latching position shown in FIGS. 1 and 14. However, any axial separation force exerted on the female connector part 12 and/or the male connector part 16 tending to axially separate the male connector part 16 from the female connector part 12 will forcibly urge the end 47 of the finger 40 against the surface 50 to resist any further axial movement and to thereby increase the axial pull out force resistance of the quick connector 10. An undercut or relief 51 is formed at one end of the surface 50 to enable a positive interference fit between end 47 and surface 50.

Figure 4:
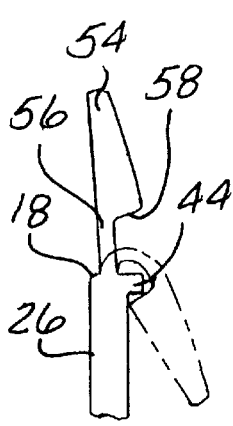
FIG. 4 is an alternate embodiment of the retainer.

As mentioned above, the fingers 40 forming the retainer means 14 may be provided in a number of different embodiments. As shown in FIG. 4, the finger 54 has a shape similar to the finger 40 shown in FIGS. 1 and 2. However, the web 56 integrally connected to the finger 54 extends directly axially from the open first end 18 of the female connector part 12. A notch 58 is formed between the web 56 and one end of the finger 54 to enable the finger 54 to be folded radially inward to the position its latching position, as shown in phantom in FIG. 4.

Figure 5:
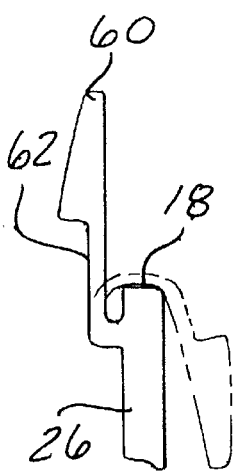
FIG. 5 is another embodiment of the retainer.

In the embodiment shown in FIG. 5, the finger 60 has a shape similar to the finger 54, but rotated 180° so that the tapered outer edge is external of the cylindrical portion 26 of the housing 12. A web 62 for the finger 60 projects from a position on the cylindrical portion 26 of the female connector part 12 spaced a small distance axially from the open first end 18 of the female connector part 12. The web 62 has a sufficient length to enable the finger 60 to be folded over the open first end 18 and into the bore 22 in the female connector part 12 as depicted in phantom in FIG. 5.

The finger 66 shown in the embodiment depicted in FIG. 6 is similar to finger 40. However, in this embodiment, the web 68 extends axially from the inward radially extending projection 44 on the cylindrical portion 26 of the female connector part 12. The web 68 as a sufficient length to enable the finger 66 to be bent angularly radially inward into the female connector part 12 is shown in phantom in FIG. 6. Further, the projection 44 has the surface 50 or formed thereon which interacts with one edge 69 on the finger 66 to resist axial pull out of the female and male connector parts 12 and 16.

In FIG. 7, a finger 72 extends axially from the first end 18 of the female connector part 12. A web 74 interconnecting the finger 72 and the open first end 18 of the cylindrical portion 26 has a projection 76 spaced between two recesses. The projection 76 fits over the end of the cylindrical portion 26 and the first open end 18 of the female connector part 12 when the finger 72 is folded to its latching position shown in phantom in FIG. 7.

In manufacturing the female connector part 12, the female connector part 12 with the integral retainer 14 is molded as a one piece, unitary part. Prior to coupling the female connector part 12 to the male connector 16, the fingers 40, etc., forming the retainer means 14 will be folded inward about their respective web 42, etc., into the interior of the bore 22 extending from the first open end 18 of the female connector part 12. As described above, the fingers 40 will preferably have a sufficient length and overlap each other at their outer ends 48 so as to retain the fingers 40 in the radially inward, angularly extending position shown in FIGS. 1 and 3 and as described above.

Referring now to FIGS. 8 and 9, there is depicted an optional clip 80 which is mountable about the tubular cylindrical portion 26 and over the first end 18 of the female connector part 12 to add additional pull out strength to the quick connector 10. The clip 80 is preferably formed of spring steel and includes a first outer annular flange 82. A stepped annular inner flange 84 extends inward from the outer flange 82. The aperture 88 is formed within the flange 88 sized to releasably extend over the outer diameter of the male connector part 16. A discontinuity 87 is formed in the flanges 82 and 84 to enable the clip 80 to be snapped over the male conduit 16, if necessary. A series of barbs 86 are formed in a wall 83 axially, interconnecting the stepped flanges 82 and 84 and extend inward to the interior of the clip 80 formed by an inner aperture 88. The barbs 86 are positioned to engage and dig into the surface of the tubular portion 26 of the female connector part 12 to securely retain the clip 80 in position over the open first end 18 of the female connector part 12. In this position, the inward extending portion of the stepped flange 84 overlays the open first end 18 of the female connector part 12 and prevents any outward movement of the fingers 40 from the bore 22 in the female connector part 12.

FIG. 9 also depicts an additional feature of the present invention. An annular seal 90, such as an O-ring, may be mounted in the first portion of the stepped bore 22 in the female connector part 12 at a sealing position between the inner surface of the cylindrical portion 22 of the female connector part 12 and the annular flange 30 on the male connector part 16 when the male connector part 16 is fully inserted into the bore 22 in the female connector part 12. The seal 90 also engages the finger(s) to bias the fingers into engagement with the annular flange.

FIGS. 10 and 11 depict yet another embodiment of a one piece quick connector 130 with an integral retainer. A radially enlarged end portion 134 extends from a tubular end portion 132 of the female connector part 130 and initially is formed with at least one and preferably a plurality of circumferentially spaced fingers 136. Each finger is spaced from adjacent fingers by a cut out or recess 138.

Although the female connector part 130 with the integral retainer shown in FIGS. 10 and 11 could be formed of a resilient material, such as a plastic, it is preferred that the female connector part 130 to be formed of a metal, such as steel. As shown in FIG. 10, the female connector part 130 is initially formed with the fingers 136 extending axially along the length of the female connector part 130, generally parallel to the cylindrical end portion 132. The fingers 136 are then bent radially inward into the open of the bore extending through the female connector part 130 to an angularly and inward extending position as shown in FIG. 11. An intermediate portion 140 of each finger 136 adjacent to the inner edge of the recesses 138 may be bent generally parallel to the enlarged end portion 134 to provide additional resiliency to the inward bent end portion of each finger 136.

The female connector part 130 with integral retainer fingers 136, as shown in FIGS. 10 and 11 functions in the same manner as the previous integral retainers in that the outer end of the fingers 136 are positioned to snap behind the annular flange 30 on the male connector part 16 after the male connector part 16 has been fully inserted into the bore in the female connector part 130.

Figure 12:
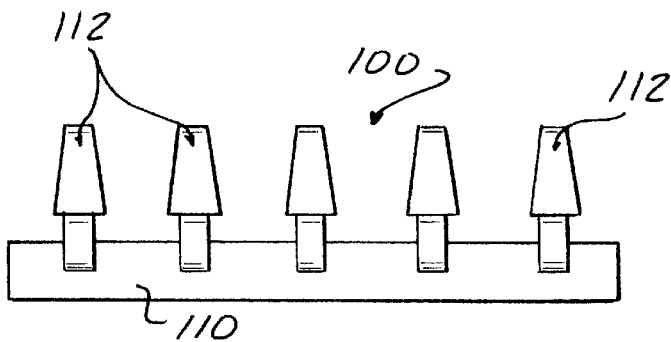
FIG. 12 is a front elevational view of a preassembled metal strip used to form a retainer according to an alternate embodiment of the present invention.
Figure 13:
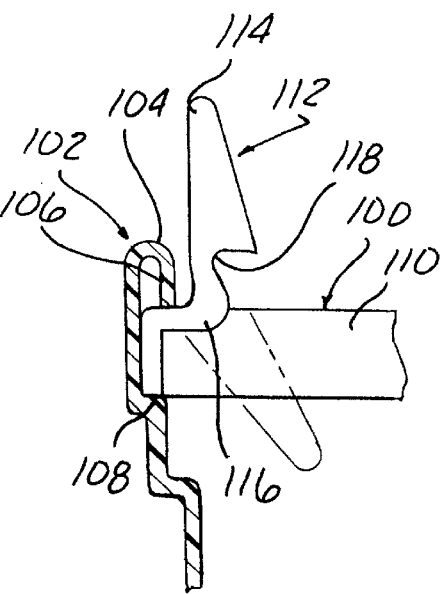
FIG. 13 is a partial, cross-sectional view showing the mounting of the metal strip of FIG. 12 in one end of a quick connector.
Figure 14:
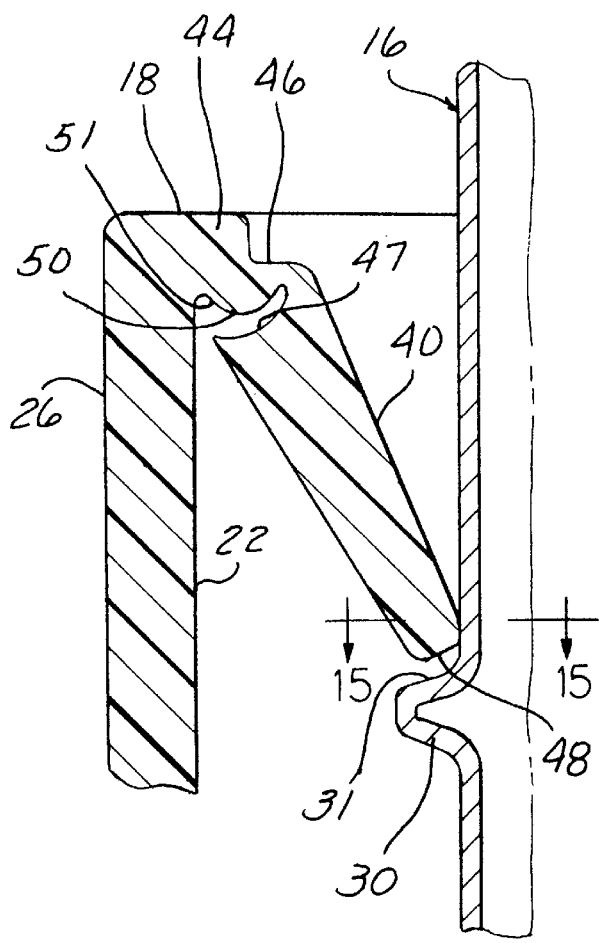
FIG. 14 is an enlarged cross-sectional view of the retainer finger in a locking position.
Figure 15:
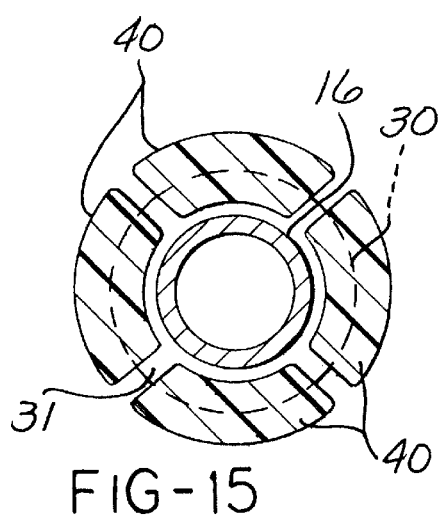
FIG. 15 is a cross-sectional view generally taken along line 15—15 in FIG. 14.

Referring now to FIGS. 12 and 13, there is depicted yet another embodiment of a retainer 100 usable with a quick connector. As shown in FIGS. 12 and 13, the retainer 100 is most advantageously employed with a metal type quick connector 102, the end portion of which is shown in FIG. 13. Such a connector, which is described in greater detail in U.S. Pat. No. 5,084,954, has a folded or rolled over outer end 104 which forms an inwardly extending flange 106 adjacent the open end of the connector 102. The retainer 100 is sized to snap into the inner bore of the quick connector 102 and seat between the inner flange 106 and a stepped shoulder 108 in the cylindrical end portion of the female connector part 102.

The retainer 100 is in the form of an elongated band 110 which is formed of a suitable resilient material, such as a suitable plastic. A plurality of arrow-shaped fingers 112 are integrally formed with the band 110 and are spaced apart along the length of the band 110.

As shown in detail in FIG. 13, each finger 112 has an arrow-shaped outer end portion 114 which is connected by a thin web 116 to the band 110. A notch or recess 118 is formed between the arrow-shaped outer end 114 and the web 116 to facilitate inward bending of the arrow-shaped outer end portion 114 to the position shown in phantom in FIG. 11 wherein each finger 112 is in position to engage the annular flange 30 on the male connector part 16, as described above.

In summary, there has been disclosed a unique one piece quick connector with integral retainer which provides the required functions of a quick connector in so far as sealingly coupling a male connector to a female connector while providing high pull out resistance. Further, the quick connector of the present invention, due to the use of an integral retainer, has a reduced cost due to the reduction in the number of separate components used to form the quick connector as well as a simplified assembly. The quick connector with integral retainer of the present invention may be provided in different forms for use with a wide variety of different connector types and to meet the requirement of different applications.

What is claimed is:

1. A quick connector adapted for selective locking engagement with a male connector part having a radially extending abutment surface, the quick connector comprising:
    a housing having a through bore extending from a first end to a second end of the housing; and
    at least one bendable retainer finger integrally formed as a one piece extension of the housing;
    a flexible web connecting the at least one bendable retainer finger to the housing allowing the at least one retainer finger to be returnably moved from a first manufactured position incapable of locking engagement with the male connector part to a second position in the through bore in the housing to engage the abutment surface on the male connector part upon insertion of the male connector part into the through bore in the housing.

2. The quick connector of claim 1 wherein the at least one bendable retainer finger comprises a plurality of circumferentially spaced, bendable retainer fingers.

3. The quick connector of claim 1 wherein the at least one bendable retainer finger comprises at least one pair of bendable retainer fingers.

4. The quick connector of claim 1 wherein the at least one bendable retainer finger comprises at least one pair of diametrically opposed retainer fingers.

5. The quick connector of claim 1 wherein the web extends axially from the first end of the housing.

6. The quick connector of claim 1 wherein the web projects axially from a radially inward extending projection adjacent the first end of the housing.

7. The quick connector of claim 1 wherein the web extends axially from an external surface on the housing spaced from the first end of the housing.

8. The quick connector of claim 1 wherein the flexible web has at least one smaller dimension than the corresponding dimensions of the adjacent portion of the housing and the at least one retainer finger.

9. A quick connector adapted for selective locking engagement with a male connector part having a radially extending abutment surface, the quick connector comprising:
    a housing having a through bore extending from a first end to a second end of the housing;
    at least one bendable retainer finger integrally formed as a one piece extension of the housing and projecting from the first end of the housing, the at least one retainer finger movable from a first, normal, inoperative position to a second position in the through bore in the housing to engage the abutment surface on the male connector part upon insertion of the male connector part into the through bore in the housing;
    a flexible web connecting the at least one bendable retainer finger to the housing;
    a projection extending radially inward from the first end of the housing;
    the web coupled to the radially inward extending projection; and the at least one retainer finger having a first outer end and an opposite second end joined to the web, the second end of the at least one retainer finger normally spaced from the radially inward extending projection on the first end of the housing and engageable with the radially inward projection upon an axial force exerted in a direction to separate the male connector part from the housing.

10. A quick connector adapted for selective locking engagement with a male connector part having a radially extending abutment surface, the quick connector comprising:

a housing having a through bore extending from a first end to a second end of the housing;

at least one bendable retainer finger integrally formed as a one piece extension of the housing and protecting from the first end of the housing, the at least one retainer finger movable from a first, normal, inoperative position to a second position in the through bore in the housing to engage the abutment surface on the male connector part upon insertion of the male connector part into the through bore in the housing; and clip means, releasibly mountable over the first end of the housing, for retaining the at least one retainer finger in the second position within the through bore in the housing.

11. The quick connector of claim 10 wherein the clip means further comprises:

at least one barb extending radially inward from the clip means for engagement with the housing.

12. A quick connector adapted for selective locking engagement with a male connector part having a radially extending abutment surface, the quick connector comprising:

a housing having a through bore extending from a first end to a second end of the housing, the housing formed of metal and has an axially extending, inturned end flange at the first end thereof, the first end flange disposed within the through bore of the housing; and at least one bendable retainer finger integrally formed as a one piece extension of the housing and projecting from the first end of the housing, the at least one retainer finger movable from a first, normal, inoperative position to a second position in the through bore in the housing to engage the abutment surface on the male connector part upon insertion of the male connector part into the through bore in the housing;

the at least one retainer finger movably formed as a one piece extension of an elongated band, the band bendable into an annular shape and mountable within the housing adjacent the end flange, the at least one retainer finger extending axially relative to the housing when in the first position.

13. A quick connector adapted for selective locking engagement with a male connector part having a radially extending abutment surface, the quick connector comprising:

a housing having a through bore extending from a first end to second end of the housing, the housing formed of metal and having at least one finger integrally extending from the first end of the housing;

the finger deployable from a first axially extending, inoperative position to a second position having a first portion generally parallel to the adjacent housing and a second radially inward, angularly extending portion placing an outer end of the finger in a second position within the bore in the housing for engagement with the abutment surface on the male connector part.

14. The quick connector of claim 13 wherein the at least one finger comprises a plurality of circumferentially spaced fingers.

15. A quick connector adapted for selective locking engagement with a male connector part having a radially extending abutment surface, the quick connector comprising:

a housing having a through bore extending from a first end to a second end of the housing;

at least one bendable retainer finger integrally formed as a one piece extension of the housing and projecting from the first end of the housing, the at least one retainer finger movable from a first, normal, inoperative position to a second position in the through bore in the housing to engage the abutment surface on the male connector part upon insertion of the male connector part into the through bore in the housing; and seal means, mountable in the bore in the housing between the first and second ends of the housing, for sealingly coupling the male connector part and the housing, the seal means positioned in the housing to engage the at least one retainer finger and the abutment surface on the male connector part.

16. A quick connector adapted for selective locking engagement with a male connector part having a radially extending abutment surface, the quick connector comprising:

a housing having a through bore extending from a first end to a second end of the housing;

a plurality of bendable retainer finger integrally formed as a one piece extension of the housing and projecting from the first end of the housing, the retainer fingers each being returnably movable from a first manufactured position incapable of locking engagement with the male connector part to a second position in the through bore in the housing to engage the abutment surface on the male connector part upon insertion of the male connector part into the through bore in the housing;

each retainer finger having a first outer end and an opposite second end joined with the housing, each retainer finger having a characteristic length (L); and wherein L is greater than a nominal radius of the bore at the first end of the housing, but is less than twice the nominal radius.

17. The quick connector of claim 16 further comprising a plurality of the at least one retainer finger disposed in circumferentially opposed relationship whereby, when in the second position, respective outer ends of the retainer fingers are juxtaposed to prevent repositioning of the retainer fingers to the first position.

18. A quick connector adapted for selective locking engagement with a male connector part having a radially extending abutment surface, the quick connector comprising:

a housing having a through bore extending from a first end to a second end of the housing;

at least one bendable retainer finger integrally formed as a one piece extension of the housing and projecting from the first end of the housing, the at least one retainer finger movable from a first, normal, inoperative position to a second position in the through bore in the housing to engage the abutment surface on the male connector part upon insertion of the male connector part into the through bore in the housing; and resilient means, disposed within the bore, for effecting a fluid seal between an outer circumferential surface of the male connector part and an inner circumferential surface of the housing, the resilient means operative to urge an outer end of the at least one retainer finger into continuous engagement with the male connector part.

* * * * *